United States Patent
Hergenrother et al.

(10) Patent No.: US 6,579,949 B1
(45) Date of Patent: Jun. 17, 2003

(54) PREPARATION OF LOW HYSTERESIS RUBBER BY REACTING A LITHIUM POLYMER WITH A SULFUR CONTAINING REAGENT

(75) Inventors: William L. Hergenrother, Akron, OH (US); Christine M. Rademacher, Akron, OH (US); James D. Ulmer, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 26 days.

(21) Appl. No.: 10/020,666

(22) Filed: Oct. 30, 2001

(51) Int. Cl.$^7$ .................................................. C08F 8/34
(52) U.S. Cl. ..................... 525/342; 525/343; 525/355; 525/359.1; 526/173; 526/204; 526/205; 526/213; 526/335
(58) Field of Search .................. 524/74, 78, 424, 524/445, 459; 525/342, 343, 355, 359.1, 370; 526/173, 204, 205, 213, 335

(56) References Cited

U.S. PATENT DOCUMENTS

| | | | |
|---|---|---|---|
| 4,698,407 A | * | 10/1987 | Nakagima et al. ............ 528/14 |
| 5,316,711 A | | 5/1994 | Throne |
| 5,317,057 A | | 5/1994 | Hall et al. |
| 5,922,810 A | * | 7/1999 | Schwindeman et al. .... 525/194 |
| 6,194,509 B1 | | 2/2001 | Lin et al. |

FOREIGN PATENT DOCUMENTS

JP    57170939 A  * 10/1982  .......... C08L/21/00

OTHER PUBLICATIONS

Thomas Kleiner et al., "Agent Hikes Cure Temperatures, Reduces Reversion", *Rubber & Plastics News*, Jan. 14, 2002, pp. 14, 16, 19–21.

* cited by examiner

Primary Examiner—Robert Dawson
Assistant Examiner—Marc S Zimmer
(74) Attorney, Agent, or Firm—Meredith Palmer; Donald Bobak

(57) ABSTRACT

A vulcanized elastomeric composition of matter comprises the reaction product of a sulfur-containing reagent with an anionic living polymer, the reagent being selected from the group consisting of $R_3$—Si—S—R'—X, where R can all be the same or different and is selected from the group consisting of alkyls having from 1 to 8 carbon atoms, cycloalkyls having from 3 to 11 carbon atoms, or an arylene having from 6 to 14 carbon atoms, and X is a halogen, to form a $R_3$—Si—S—R' ended polymer; a filler; processing oil; and a cure package containing a deprotecting agent and at least one sulfur cure accelerator. A method for making a vulcanized elastomeric composition of matter comprises terminating a living anionic polymer with a sulfur-containing reagent selected from the group consisting of $R_3$—Si—S—R'—X, where R can all be the same or different and is selected from the group consisting of alkyls having from 1 to 8 carbon atoms, cycloalkyls having from 3 to 11 carbon atoms, or aryls having from 6 to 14 carbon atoms, R' is an alkylene having from 1 to 8 carbon atoms, a cycloalkylene having from 3 to 11 carbon atoms, or an arylene having from 6 to 14 carbon atoms, and X is a halogen, to form a $R_3$—Si—S—R' polymer having a protected mercapto group; deprotecting the mercapto group prior to or during vulcanization of the composition, and attaching the mercapto group to a polymer backbone of one of the polymers. A method is also provided for reducing hysteresis and the invention provides improved pneumatic tires.

19 Claims, No Drawings

PREPARATION OF LOW HYSTERESIS RUBBER BY REACTING A LITHIUM POLYMER WITH A SULFUR CONTAINING REAGENT

BACKGROUND OF THE INVENTION

This invention relates generally to the preparation of low hysteresis rubber by termination with a sulfur-containing reagent.

It is often desirable to produce elastomeric polymers capable of exhibiting reduced hysteresis when properly compounded with other ingredients such as reinforcing agents and then vulcanized. Such elastomers, when fabricated into components for constructing articles such as tires, vibration isolators, power belts, and the like, will manifest properties of increased rebound, decreased rolling resistance and reduced heat-build up when subjected to mechanical stress during normal use.

The hysteresis of an elastomers refers to the difference between the energy applied to deform an article made from the elastomer and the energy released as the elastomer returns to its initial, un-deformed state. In pneumatic tires for instance, lowered hysteretic properties are associated with reduced rolling resistance and reduced heat build-up during operation of the tire. These properties, in turn, result in lowered fuel consumption of vehicles using such tires and prolonged tire life. In such contexts, the property of lowered hysteresis of compounded, vulcanizable elastomer compositions is particularly significant.

Examples of such compounded elastomer systems are known to the art and are comprised of at least one elastomer (that is, a natural or synthetic polymer exhibiting elastomeric properties, such as a rubber), a reinforcing filler agent (such as finely divided carbon black, thermal black, or mineral fillers such as clay, silica and the like) and curing with a sulfur-containing vulcanizing system.

Various synthetic strategies have been developed to provide elastomers with molecular structures exhibiting reduced hysteresis. One technique is to produce elastomers of very high molecular weight. In such high molecular weight systems, the number of free, unattached molecular chain-ends per given weight in the vulcanizates made from them are reduced. Because the presence of free, unbound chain ends is believed to be a significant factor in hysteretic energy loss (because they cannot participate in the elastic recovery processes), reducing their number is believed to lead to a desirable reduction in hysteretic energy loss. A reduction in the measured tan δ of the elastomer is indicative of a reduction in the hysteresis of the elastomer.

Another approach to producing elastomers with reduced hysteresis properties involves "jumping" of elastomer intermediates having a terminal functionality which is reactive under anionic polymerization conditions. Such jumping reactions join two elastomer molecules at their functional ends to produce a single molecule of much higher molecular weight. Such participation again reduces the number of free, unbound chain ends in the vulcanizate which results in low hysteretic energy loss.

It has also been recognized that carbon black, employed as a reinforcing filler in rubber compounds, should be well dispersed and separated throughout the rubber in order to improve various physical properties. One physical property that is improved by this dispersion and separation is a lowered level of hysteresis in the resultant vulcanizate. This improved dispersion may be achieved, for example, by reacting a metal terminated polydiene with a capping agent, such as a halogenated nitrile, a heterocyclic aromatic nitrogen-containing compound or a trialkyl tin halide. Additionally, it is known in the art that both ends of the polydiene chains can be capped with polar groups by utilizing functionalized anionic initiators, such as lithium amide or lithium trialkyl tin halides.

In another approach to reducing hysteresis, lithium amino magnesiate anionic polymerization initiators, stable at high polymerization temperatures, have been employed to produce polymers containing a high level of tertiary amine functionality with functional end groups derived from the initiator. Such polymers can be compounded to produce vulcanizable elastomers exhibiting reduced hysteresis properties.

It has also been known to produce modified elastomers with purely hydrocarbyl terminal functionality which are capable of conferring low hysteresis properties. For example, commonly assigned U.S. patent application Ser. No. 07/636,961 describes elastomers with tin containing end-groups derived by initiating polymerization under anionic conditions with tin-lithium compounds such as trialkyl tin (IV) lithium, that is, (alkyl)$_3$SnLi groups.

Another technique is to prepare elastomer molecules with end groups capable of interacting with the reinforcing fillers, such as carbon black, present in compounded elastomer compositions. Also, such interaction with carbon black is thought to coat the aggregated carbon black and reduce formation of the carbon black network. Such interactive end groups include those derived from various metal reagents as well as those derived from polar organic reagents such as amines, amides, esters, imines, imides, ketones and various combinations of such groups. One example of functional end-capping is provided in published European Patent Application Number EP 0 316 255A2 which discloses a process for end-capping polydienes by reacting a metal terminated polydiene with a capping agent such as a halogenated nitrile, a heterocyclic aromatic nitrogen containing compound or an alkyl benzoate. Additionally, the application discloses that both ends of the polydiene chains can be capped with polar groups by utilizing functionalized initiators, such as lithium amides.

End functionalized polymers, also known as telechelic and semi-telechelic polymers, are industrially important polymers and pre-polymers in their own right. They are used for preparing segmented block copolymers and crosslinked materials and, are also useful in preparing graft copolymers.

Still other strategies aimed at preparing reduced hysteresis compounds have included high temperature mixing of the filler-rubber mixtures in the presence of selectively reactive promoters to promote compounding material reinforcement, surface oxidation of the compounding materials, and chemical modifications to the terminal end of polymers using 4,4'-bis(diethylamino)-benzophenone (Michler's ketone), tin coupling agents and the like, and surface grafting thereon. All of these approaches have focused upon increased interaction between the elastomer and the compounding materials.

Use of organolithium initiators to polymerize conjugated diene, triene, and monovinyl aliphatic and aromatic monomers is known in the art. These polymerizations proceed according to anionic polymerization mechanisms. That is, these polymerization reactions generally include the reaction of monomers by nucleophilic initiation to form and propagate a polymeric structure. Throughout the formation and propagation of this polymer, the polymeric structure is ionic or "living". A living polymer, therefore, is a polymeric segment having at least one living or reactive end. For example, when a lithium containing initiator is employed to initiate the formation of a polymer, the reaction will produce a reactive polymer having a lithium atom at its living or reactive end.

Organolithium initiators are known in the art. Initiators which are specifically known include N-lithiohexamethyleneimine, n-butyllithium, tributyl tin lithium, dimethylaminolithium, diethylaminolithium, dipropylaminolithium, dibutylaminolithium, dialkylaminoalkyllithium, such as diethylaminopropyllithium and trialkly stannyl lithium, among others.

Chain propagation of an anionically-polymerized polymer typically ceases when all available monomer is consumed or when the living end is quenched or terminated. Typically, termination occurs in the presence of an electrophilic reagent, a terminating agent or a proton donor. Also, living polymers can spontaneously terminate because their carbanion centers decay with time. Spontaneous termination is also prevalent at higher polymerization temperatures where inter-polymer coupling likewise occurs.

The ability to anionically produce living polymers with very narrow molecular weight distributions and then cap the living end, or ends, with a functional group is also generally known in the art. Specifically, termination to produce amines and carboxylic acids has been very successful. Synthesis of polystyrene and polyisoprene containing living polymers with hydroxy (OH) and mercapto (SH) functional end caps were obtained by reacting the living polymer with haloalkanes containing silyl ether and silyl thioether functions (as shown) has also been described as follows.

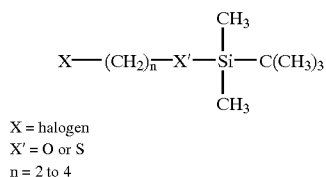

X = halogen
X' = O or S
n = 2 to 4

The tertiary-butyldimethylsilyl (TBDMS) group is the preferred choice for OH and SH functions in the terminating reactions because the corresponding silyl ethers and thioethers are found to be both stable and compatible with anionic living polymers. A detailed description of the chemistry can be found in the *Journal of Macromolecular Chemistry and Physics*, "Synthesis of end-functionalized polymer by means of living anionic polymerization", 197 (1996), pp. 3135–3148.

The rubber compositions can be cured in any conventional manner with known vulcanizing agents. For example, sulfur or peroxide-based curing systems may be employed. For a general disclosure of suitable vulcanizing agents one can refer to Kirk-Othmer, *Encyclopedia of Chemical Technology* 3rd, Ed, Wiley Interscience, N.Y. 1982, Vol. 20. pp. 365–468, specifically "Vulcanizing Agents and Auxiliary Materials" pp. 390–402. The vulcanizing agents can be used alone or in combination.

While the above cited reference employs a sulfur containing reagent in the termination of polystyrene and polyisoprene, the reference only addresses the problems associated with a broad molecular weight distribution. Heretofore, the problems associated with hysteresis and significant improvement in various articles such as tires with hysteresis reduction have not been addressed. That is, the prior art consists of descriptions relating to endcapping of lithium polymers with nitrogen or tin containing reagents. The use of a protected or blocked mercaptan as an endcapping reagent has not been demonstrated as a way of reducing hysteresis.

SUMMARY OF THE INVENTION

Thus, a need still exists for methods of preparing polymers and vulcanized elastomers that exhibit reduced hysteresis properties.

In general, the present invention provides a vulcanized elastomeric composition of matter comprising the reaction product of a sulfur-containing reagent with an anionic living polymer said reagent being selected from the group consisting of $R_3$—Si—S—R'—X, where R can all be the same or different and is selected from the group consisting of alkyls having from 1 to 8 carbon atoms, cycloalkyls having from 3 to 11 carbon atoms, or aryls having from 6 to 14 carbon atoms, and X is a halogen, to form a $R_3$—Si—S—R' ended polymer; a filler; processing oil; and a cure package containing a deprotecting agent and at least one sulfur cure accelerator.

The present invention also provides a pneumatic tire comprising a vulcanized elastomeric composition of matter with reduced hysteresis properties, wherein the composition comprises a plurality of polymers functionalized with mercapto groups, the mercapto groups in a majority of said functionalized polymers being reacted with unsaturation sites in a polymer backbone, wherein the mercapto groups comprise tert-butyldimethylsilyl-3-chloro-1-propylsulfide.

The present invention provides a method for making a vulcanized elastomeric composition of matter by terminating a living anionic polymer with a sulfur-containing reagent selected from the group consisting of $R_3$—Si—S—R'—X, where R can all be the same or different and is selected from the group consisting of alkyls having from 1 to 8 carbon atoms, cycloalkyls having from 3 to 11 carbon atoms, or aryls having from 6 to 14 carbon atoms, R' is an alkylene having from 1 to 8 carbon atoms, a cycloalkylene having from 3 to 11 carbon atoms, or an arylene having from 6 to 14 carbon atoms, and X is a halogen, to form a $R_3$—Si—S—R' polymer having a protected mercapto group; deprotecting the mercapto group prior to or during vulcanization of the composition, and attaching the mercapto group to a polymer backbone of one of the polymers.

The present invention also provides a method for reducing hysteresis in an elastomeric composition of matter by deprotecting a $R_3$—Si—S—R' endcapped polymer, where R can all be the same or different and is selected from the group consisting of alkyls having from 1 to 8 carbon atoms, cycloalkyls having from 3 to 11 carbon atoms, or aryls having from 6 to 14 carbon atoms, and R' is an alkylene having from 1 to 8 carbon atoms, a cycloalkylene having from 3 to 11 carbon atoms, or an arylene having from 6 to 14 carbon atoms, to form a mercapto functional polymer having mercapto ends; and linking the functional polymer to an unsaturated polymer backbone during or subsequent to vulcanization, such that the resultant elastomeric composition formed includes a plurality of functional polymers having had mercapto ends wherein at least 20 percent are reacted with an unsaturated polymer backbone of the same functional polymer or another of the functional polymers.

This invention advantageously allows a high percentage of the sulfur end caps to be utilized in a hysteresis reducing pathway, particularly when compared to the nitrogen-containing or tin-containing terminated rubbers. The protecting group is removed subsequent to or during vulcanization and then the curatives present in the compound promote a high level (e.g., from about 20 percent up to about 80 percent or more) of the unprotected (free) mercapto groups to react with carbon to carbon double bonds in the polymer backbone. Such a reaction reduces the number of unattached polymer ends present in the vulcanizate and thereby reduces hysteresis (i.e. reduces the tan δ).

Advantageously, the use of the reaction product of tert-butyldimethylsilyl-3-chloro-1-propylsulfide with an ionic living polymer as claimed in this invention allows for normal compounding procedures without the risk of premature crosslinking, curing or vulcanization and still allows the polymer endcaps to react with unsaturated sites subsequent to or during the final vulcanization step.

Further, the invention advantageously allows zinc compounds, such as zinc stearate, that are already present in the rubber composition to be used as the means for deprotecting the polymer endcaps alleviating the need for a separate deprotection step.

Also advantageously, the invention can use hydrogen ions or fluorine ions to deprotect the polymer endcaps to allow attachment to the polymer backbone.

As a result of the use of these rubbers, tires and more particularly, tire treads are believed to show improved wear and vehicles using such tires are believed to show improved fuel efficiency.

It should become apparent from the specification that follows that one or more of the foregoing advantages obtained by this invention over the prior existing art, can be accomplished as described and claimed herein.

DETAILED DESCRIPTION OF PREFERRED EMBODIMENTS

As noted hereinabove, the present invention is directed toward the preparation of low hysteresis rubber. More specifically, the invention is directed toward the preparation of low hysteresis rubber by terminating an anionically-initiated lithium polymer with a sulfur containing reagent, namely tert-butyl dimethylsilyl-3-chloro-1-propylsulfide, and subsequent reaction of the potential mercaptan end group to produce a mercapto end group which can then react with the unsaturation in the polymer backbone of one of the polymers employed.

The anionically-initiated lithium polymer is defined as a "living polymer." Such a living polymer of the present invention has the general formula, prior to quenching, of polymer-Li where the polymer is any diene homopolymer, diene copolymer, aromatic homopolymer, diene/monovinyl aromatic random copolymer or unsaturated elastomer. The lithium proceeds to add monomers to grow the chain as polymerization continues, until the reaction is quenched or terminated. Scheme I shows initiation of polymerization using an organolithium initiator.

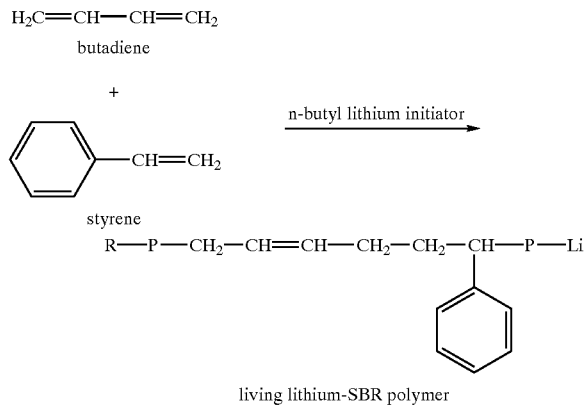

In Scheme 1, R is selected from the group consisting of functionalized and non- functionalized lithium-organo groups (e.g., n-butyl lithium) while P is the repeat polymer chain, butadiene-styrene.

Polymerization is usually conducted in a conventional solvent for anionic polymerizations such as hexane, cyclohexane, benzene and the like. Other techniques for polymerization, such as semi-batch and continuous polymerization may be employed. In order to promote randomizing during copolymerization and to increase vinyl content, a modifier may optionally be added to the polymerization ingredients. Amounts range between 0 to about 90 or more equivalents per equivalent of lithium. The amount depends on the vinyl content desired, the level of styrene employed and the temperature of the polymerizations, as well as the selected modifier.

Compounds useful as modifiers are organic and include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); THF; THF oligomers; linear and cyclic oligomeric oxolanyl alkanes, and the like. Details of linear oligomeric oxolanyl modifiers can be found in U.S. Pat. No. 4,429,091, owned by the Assignee of record, the subject matter of which is incorporated herein by reference.

Polymerization is usually begun by charging a blend of the monomer(s) and solvent to a suitable reaction vessel, followed by the addition of the modifier and the initiator solution. Alternatively, the monomer and modifier can be added to the initiator. The procedure is carried out under anhydrous, anaerobic conditions. The reactants are heated to a temperature of from about 30° to about 120° C. and are agitated for about 0.15 to about 24 hours. After polymerization is complete, the product is quenched or terminated.

Quenching is usually conducted by stirring the polymer and quenching or terminating agent for about 0.05 to about 2 hours at temperatures of from about 30° to 120° C. to ensure complete reaction.

Lastly, the solvent is removed from the polymer using coagulation with water, alcohol or steam. If coagulation with water or steam is used, oven drying may be desirable.

The present invention is preferably terminated with a sulfur-containing terminating agent. The preparation of such a sulfur terminated rubber from the reaction with a lithium polymer produced a rubber having both a reduced number of non-reactive ends and an increase of potentially reactive ends. The latter are activated by removing the silyl blocking agent during cure to give a reduced level of hysteresis. It has been found in this invention that the use of a protected or blocked mercapto group as an endcapping reagent reduces hysteresis in vulcanizable compositions of matter that are useful for making tires, and is expected to provide tires and tire components having decreased hysteresis properties without substantially affecting the mechanical, wear, and tear strength of the tire rubber. Accordingly, the present invention contemplates vulcanized compositions of matter, tire recipes, belts and tire components containing mercapto functionalized polyolefin. The invention also contemplates the method of manufacture of the same.

Illustrative examples of useful polyolefin rubbers include, but are not limited to homopolymers and copolymers of isoprene and butadiene, such as polyisoprene and polybutadiene and poly(butadiene-isoprene), and, copolymers and terpolymers of styrene, butadiene and isoprene such as poly(styrene-isoprene), poly(styrene-butadiene) (SBR), poly(butadiene-styrene-isoprene) and combinations thereof. Any unsaturated (polymer containing unsaturation) useful in the manufacture of vulcanizates is useful in terms of the present invention. Scheme II shows terminating the living polymer with a sulfur containing reagent, namely tertbutyldimethylsilyl-3-chloro-1-propylsulfide, to form the protective functional endcap for the polymer which, in this scheme, is shown to be an SBR copolymer.

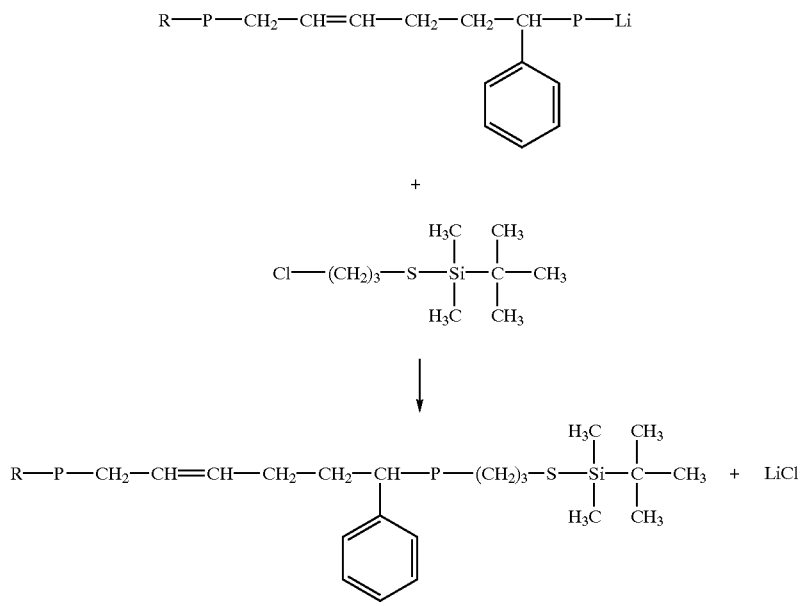

The tert-dimethyl silyl propylsulfide endcap is relatively unreactive which allows for increased processability without premature crosslinking or vulcanization. Moreover, when compared to the nitrogen or tin containing terminated rubbers of the prior art, this invention has the advantage of allowing a very high percentage of the sulfur endcaps to be utilized in the hysteresis reducing reaction pathway. In the instant case, prior to vulcanization or during the step of curing, and particularly sulfur curing, the protecting tert-dimethyl silyl group can be removed by using a deprotecting agent selected from the group consisting of additives containing $H_+$, additives containing $F^-$, and zinc compounds. It will be appreciated that additives containing the hydrogen or fluorine ions can be used to provide the necessary deprotecting capabilities of the ions. Because zinc stearate is already generally present in vulcanization cure packages it is the preferred deprotecting agent of the invention. Zinc stearate allows deprotection without adding a deprotection step to the manufacturing process. Stoichiometric amounts of the deprotecting agent are employed. Scheme III shows deprotecting the functional endcap of the quenched polymer.

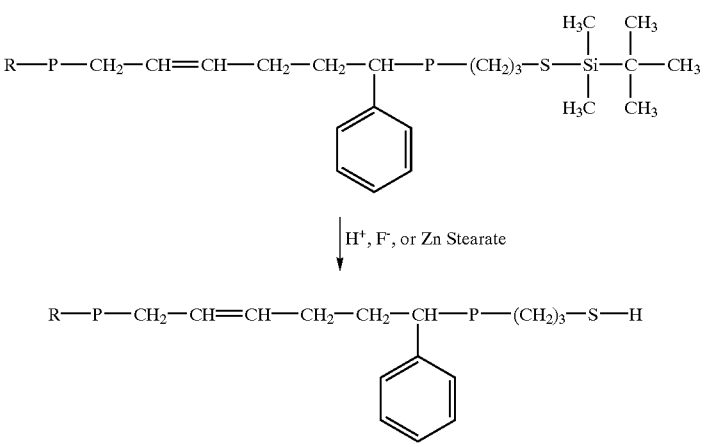

SBR polymer with mercapto functional endcap

Scheme IV

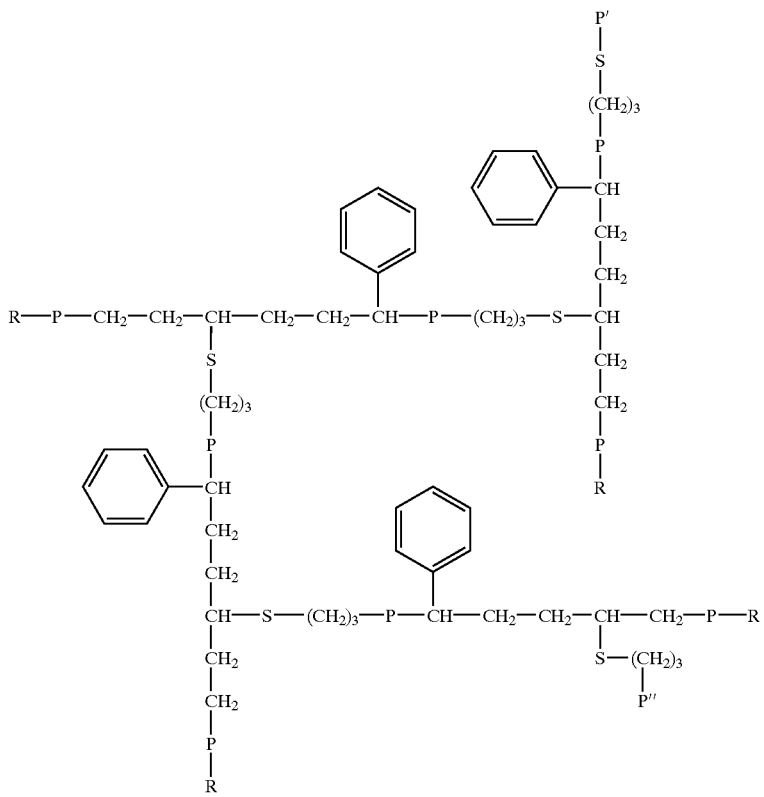

Prior to vulcanization, and preferably during vulcanization, the tert-butyl dimethyl silyl protective endcap is removed. Then, during or subsequent to the curing process, the curatives present in the compound promote a high level of the exposed, unprotected-SH mercapto functional endcaps to react with or attach to the unsaturation points in the unsaturated polymer backbone. Notably, at least 20 percent and preferably, a majority of the mercapto ends are reacted with the unsaturation sites in the unsaturated polymer backbone. More preferably, at least 70 percent of the mercapto ends are reacted, and testing has shown that up to about 80 percent of the mercapto ends can be reacted. The carbon to carbon double bond unsaturation points may be located on the same polymer chain as the functional endcap or on another polymer chain. The vulcanization step proceeds as known in the art. Scheme IV shows mercapto endcaps crosslinked to an unsaturated polymer backbone.

In the preceding Scheme, the R and P groups are as previously designated, while the P' and P" groups represent another unsaturated polymer backbone, i.e., any of the unsaturated polymers described hereinabove. While P' and P" can be the same or different backbones, the P' group is one in which the mercapto group has reacted with a site of unsaturation. The P" group designates one in which the mercapto end cap of that backbone has reacted with the site of unsaturation from a previously reacted mercapto end group polymer backbone.

In light of the foregoing, it will be appreciated that the reaction of the unprotected mercapto end groups to the polymer backbone reduces the number of unattached polymer ends present in the vulcanized rubber, thereby reducing the tan δ of the composition and reducing the hysteresis of the composition.

In order to form vulcanized elastomeric compositions, the polymers of the present invention can be vulcanized with conventional vulcanizing agents, such as sulfur and accelerators. The amount of the agent used is 0.1 to 5 parts by weight, preferably 0.1 to 3 parts by weight, based on 100 parts by weight of the rubber material, with a range of from about 0.1 phr to about 2 phr being preferred. When the amount is more than 5 parts by weight, the rubber elasticity is lost.

Representative of conventional accelerators are amines, guanidines, thioureas, thiols, thiurams, sulfonamides, dithiocarbamates and xanthates which are typically added in amounts of from about 0.2 to about 10 phr, with a range of from about 2 phr to about 5 phr being preferred. Representative of sulfur vulcanizing accelerators include TMTD (tetramethylthiuram disulfide), CBS (N-cyclohexyl-2-benzothiazole sulfenamide), MBT (mercaptobenzothiazole) and mixtures thereof.

The elastomer compositions may also contain conventional additives including reinforcing fillers and non-reinforcing fillers, peptizing agents, pigments, stearic acid, antiozonants, antioxidants, processing oils, activators, initiators, plasticizers, waxes, prevulcanization inhibitors, extender oils, waxes, and the like. Representative of reinforcing agents include carbon black, which is typically added in amounts ranging from about 5 to 100 parts by weight based on 100 parts by weight of total rubber (phr). Preferably, carbon black is used in amounts ranging from about 15 to 85 phr. Typical carbon blacks that are used include N110, N121, N220, N231, N234, N242, N293, N299, N326, N330, N332, N339, N343, N347, N351, N358, N375, N472, N539, N550, N660, N683, N754, and N765. Depending on the particular use of the compound, the appropriate carbon black may be selected.

Typical filler materials also include reinforcing and non-reinforcing fillers conventionally used in vulcanizable elastomeric compounds such as clays, talcs, mica, calcium carbonate, silica and other finely divided mineral materials. Selection of the filler material(s) (mixtures) is not critical to practice of the present invention.

Representative of the antidegradants which may be in the rubber composition include monophenols, bisphenols, thiobisphenols, polyphenols, hydroquinone derivatives, phosphites, phosphate blends, thioesters, naphthylamines, diphenol amines as well as other diaryl ainine derivatives, paraphenylene diamines, quinolines and blended amines. Antidegradants are generally used in an amount ranging from about 0.1 phr to about 10 phr with a range of from about 0.5 to 6 phr being preferred.

Representative of a peptizing agent that may be used is pentachlorophenol which may be used in an amount ranging from about 0.1 phr to 0.4 phr with a range of from about 0.2 to 0.3 phr being preferred.

Representative of processing oils which may be used in the rubber composition of the present invention include aliphatic-naphthenic aromatic resins, polyethylene glycol, petroleum oils, ester plasticizers, vulcanized vegetable oils, pine tar, phenolic resins, petroleum resins, polymeric esters and rosins. These processing oils may be used in a conventional amount ranging from about 0 to about 50 phr with a range of from about 5 to 25 phr being preferred.

Zinc oxide and stearic acid are conventionally used to vulcanize elastomers. Zinc oxide is generally used in a conventional amount ranging from about 0.5 to about 5 phr. Stearic acid is generally used in a conventional amount ranging from about 1 to about 4 phr.

The practice of the present invention is especially useful in general rubber recipes, but inasmuch as the decrease in hysteresis properties does not deleteriously impact the wear, mechanical, and tear strength of the rubber, the practice of the present invention may also be applied to the tread and sidewall stocks of pneumatic tires. Furthermore, it should be understood that the practice of the present invention is believed to be especially advantageous for off-road or heavy-duty truck tires. The practice of the present invention will also improve other tires, for example passenger tires.

In order to demonstrate the practice of the present invention, the following examples have been prepared and tested. The examples should not, however, be viewed as limiting the scope of the invention. The claims will serve to define the invention.

EXAMPLE 1

0.6 kg (1.32 lbs.) of a 34% styrene solution in dry hexane, 1.05 kg (2.32 lbs.) hexane and 2.79 kg (6.14 lbs.) of a 21.8% butadiene solution in dry hexane were added to a 2-gallon reactor. A solution of 1.6 M OOPS modifier, a linear oligomeric oxolanyl modifier, in hexane (1.04 mL) was charged, followed by 3.87 mL of a 1.6 M solution of n-butyl lithium in hexane. The reactor was heated to a temperature of 50° C., with a brief peak temperature of 61° C. After 3.5 hours, 2.09 kg (4.6 lbs.) of cement was withdrawn and quenched with 2 mL of isopropanol, treated with 2 grams of BHT and recovered to provide 0.36 kg (0.8 lbs.) of an uncapped control polymer. The remaining polymerization mixture was then treated with 0.77 mL of tert-butyldimethylsilyl-3-chloro-1-propylsulfide (224.88 g/mol, d=0.988 g/mL) and allowed to react for 1.5 hours at 65° C. The capped polymer was isolated by coagulation in excess isopropanol containing 2 grams of BHT. After drum drying, approximately 0.41 kg. (0.9 lb.) of the desired polymer was isolated. TABLE I provides a characterization of the resulting block mercaptan terminated polymer.

TABLE I

Properties of Block Mercaptan Terminated Polymer from Example I

| Test | Values |
| --- | --- |
| Mn (GPC) (g/mol) | 121000 |
| Molecular weight (GPC) | 136000 |
| Molecular Weight Distribution (GPC) | 1.12 |
| NMR (CDCl$_3$) styrene | 26.1% |
| NMR (CDCl$_3$) block styrene | 1.5% |
| NMR (CDCl$_3$) vinyl groups | 42.5% |
| dimethyl silyl, singlet | 0.3 ppm |

EXAMPLE 2

11.4 grams of a 34% styrene solution in dry hexane, 236 grams of hexane and 52.6 grams of a 21.8% butadiene solution in dry hexane were added to a dried, sealed, nitrogen-purged 0.95 liter (32 ounce) bottle. 0.14 mL of a solution of 1.6 M OOPS modifier in hexane was charged, followed by 0.47 mL of a 1.6 M hexane solution of n-butyl lithium. The bottle was agitated at 50° C. for 1 hour, yielding greater than 95% conversion of starting material to polymer. The living polymer was treated with 0.17 mL tert-butyldimethylsilyl-3-chloro-1-propylsulfide (224.88 g/mol, d=0.988 g/mL) and allowed to react for 0.6 hours at 50° C. Isolation of the polymer proceeded by treating with 1 mL isopropanol and 0.7 grams of BHT. Approximately 13 grams of polymer was recovered by air and vacuum drying. The characterization of the resultant polymer is provided in TABLE II below.

TABLE II

Properties of Block Mercaptan Terminated Polymer from Example II

| Test | Values |
| --- | --- |
| Molecular weight (GPC) (g/mol) | 23200 |
| Molecular weight (GPC) (g/mol) | 30100 |
| Molecular Weight Distribution (GPC) | 1.3 |
| NMR (CDCl$_3$) styrene | 26.4% |
| NMR (CDCl$_3$) block styrene | 0.8% |
| NMR (CDCl$_3$) vinyl groups | 55.4% |
| dimethyl silyl singlet | 0.3 ppm |
| tert-butyl, singlet | 1.0 ppm |
| (CH$_2$CH$_2$), buried multiplet | 2.6 ppm |
| (CH$_2$—S), triplet | 3.7 ppm |

EXAMPLE 3

A rubber was prepared which had 25.8% Styrene, 2.9% block styrene and 43% vinyl polybutadiene (VPBD). The resultant molecular weight (Mn) was 118,400, the glass transition temperature (T$_g$) was −40° C. and the molecular weight distribution (dispersion) (MWD) was 1.08. 100 parts of the rubber was combined with 1 part per hundred parts rubber (phr) wax, 2 phr of resin and 0.95 phr of an antioxidant to form a master batch. The master batch was combined with 3.3 phr zinc stearate, 1.5 phr sulfur, 1.4 phrN-cyclohexyl-2-benzothiazole sulfenamide (CBS) and 0.4 parts of diphenyl guanidine (DPG) and then cured. This procedure was followed four times, with introduced experimental variations, to produce four different samples. The first sample was the control and contained no additional ingredients or fillers, the second sample contained the end-capped polymer of the invention but was otherwise identical to the first sample. The third sample contained 50 phr of carbon black and 15 phr of aromatic oil, and the fourth sample mirrored the third sample's formulation but used the endcapped polymer of the invention. Various physical property and rheological property tests of the samples were then conducted and the results thereof are shown in TABLES III and IV. The data listed in TABLE IV represents the average of duplicate evaluations.

TABLE III

Properties of Sample Polymers

| Test | 1 (control) | 2 (endcap) | 3 (control) | 4 (endcap) |
|---|---|---|---|---|
| Monsanto Cure @ 165 degrees Celsius | | | | |
| ML | 0.02 | 0.04 | 0.65 | 0.75 |
| MH | 6.65 | 6.84 | 13.56 | 13.89 |
| MH-ML | 6.63 | 6.80 | 12.91 | 13.14 |
| Ts2 (Time to Scorch) (minutes) | 6.89 | 7.08 | 2.53 | 2.52 |
| Tc90 (Time to 90% Cure) (minutes) | 10.01 | 9.85 | 4.40 | 4.55 |
| tan δ @ MH | 0.012 | 0.009 | 0.118 | 0.097 |
| Ring Tensile @ 24 degrees Celsius | | | | |
| 50% Modulus, psi | 75.5 | 76.4 | 172 | 175 |
| 100% Modulus, psi | 115 | 118 | 289 | 302 |
| 200% Modulus, psi | 164 | 169 | 641 | 675 |
| 300% Modulus, psi | — | — | 1070 | 1137 |
| Tensile str., psi | 198 | 212 | 2422 | 2473 |
| % Elongation | 266 | 258 | 550 | 534 |
| Break energy, inch pounds/cubic inch | 328 | 327 | 5816 | 5787 |

TABLE IV

Analysis and Comparison of Example 3 Data
Average of 2 Trials

| Example Nos. | 1 (control) | 2 (endcap) | 3 (control) | 4 (endcap) |
|---|---|---|---|---|
| tan δ @ 7% λ & 24° C. | 0.1550 | 0.1337 | 0.2783 | 0.2568 |
| G" (MPa) @ 7% λ & 24° C. | 0.1270 | 0.1095 | 0.7760 | 0.6775 |
| ΔG' (MPa) @ 24° C. | 0.2605 | 0.2385 | 4.4625 | 3.4555 |
| G' (MPa) @ 14.5% λ & 24° C. | 0.7545 | 0.7675 | 2.2970 | 2.2070 |
| tan δ @ 7% λ & 50° C. | 0.0556 | 0.0515 | 0.2214 | 0.1904 |
| G" (MPa) @ 7% λ & 50° C. | 0.0335 | 0.0330 | 0.4355 | 0.3510 |
| ΔG' (MPa) @ 50° C. | 0.0505 | 0.0505 | 2.6755 | 1.8630 |
| G' (MPa) @ 14.5% λ & 50° C. | 0.5940 | 0.6235 | 1.6850 | 1.6240 |

The above table shows a marked difference (13.75%) in the 24° C. tan δ between Examples 1 and 2, which were totally free of any filler. Example 3, which contained 50 phr of carbon black and 15 phr of aromatic oil, showed a 7.71% difference in the 24° C. tan δ when compared to Example 4. In all instances, the endcapped stocks, Example Nos. 2 and 4, showed a reduced G" viscous modulus, when compared to the controls, Nos. 1 and 3. This also is a good indication of reduced hysteresis. In Table IV, Δ G' is defined as G' at 0.2% strain (λ) minus G' at 14.5% strain.

MODEL REACTION

In order to demonstrate the deprotection capability of fluoride and hydrogen ions and zinc stearate, the following study was performed. First, t-butyl dimethylsilyl-3-chloro-1-propylsulfide was mixed with cyclododecene to form an approximately 0.008 M solution. This solution was chosen to be about the same concentration as the end group present in a 150,000 g/mol end capped polymer. The solution was heated at 171° C. for about 30 minutes to duplicate the time required for mixing and cure. A predetermined amount (see TABLE V) of a number of reagents (as well as heated and unheated) were present in 1.5 mL solutions of 0.008M t-butyl dimethylsilyl-3-chloro-1-propylsulfide/cyclododecene in the vials. The solutions were analyzed without added reagent that either were not heated or had the same heating as described above. This was done first, to determine whether the reagent employed would cause the loss of the t-butyl dimethylsilyl group, and second, whether further reaction with cyclododecene (CCD) would occur. The mole ratio of the reagent to sulfur compound was chosen to be as close to one as possible. Analysis was done by GCMS. The results of this study are shown in TABLE V.

TABLE V

Reaction of 1.5 mL of 0.008 M t-Butyl
Dimethylsilyl-3-chloro-1-propylsulfide
in Cyclododecene with Various Reagents

| Reagents | Ratio Cpd/S | Weight Used (mg) | Recovered % ClPrSSiR3 | Deprotected % ClPrSH formed | Total % Recovered sulfur compound |
|---|---|---|---|---|---|
| No Heat | — | — | 100 | 0 | 100 |
| Heat Only | — | — | 98 | 1 | 99 |
| Octanol | 1.04 | 1.66 | 92 | 5 | 97 |
| Sorbitan sterate | 1.00 | 5.24 | 91 | 9 | 100 |
| CBS | 1.06 | 3.42 | 90 | 0 | 90 |
| PVI | 1.04 | 3.33 | 89 | 1 | 90 |
| Sulfur | 0.99 | 0.39 | 88 | 24 | 112 |
| TMTD | 1.03 | 2.63 | 88 | 16 | 104 |
| Santoflex 13 | 1.00 | 3.28 | 88 | 7 | 95 |
| Stearic acid | 1.03 | 3.57 | 87 | 12 | 99 |
| MBT | 1.01 | 2.06 | 84 | 0 | 84 |
| DPG | 0.96 | 2.48 | 78 | 29 | 107 |
| Tetra Butyl ammonium fluoride* | 0.97 | 9.44 | 18 | 82 | 100 |
| Toluene sulfonic acid hydrate | 1.08 | 2.51 | 0 | 85 | 85 |
| Zn stearate | 0.98 | 7.61 | 0 | 72 | 72 |

*The tetra butyl ammonium fluoride was used as supplied from Aldrich supported on Silica. The concentration used was the mid-point of the possible concentration. If the lowest value was used it is expected that all of the ClPrSSiR₃ would have been converted to the mercaptan.

Based upon the results of the data, the recovered percentage of t-butyl dimethylsilyl-3-chloro-1-propylsulfide (ClPrSSR₃) shows that only three of the reagents actually removed the t-butyl dimethylsilyl group, thereby deprotecting the mercaptan group. These three reagents were tetrabutyl ammonium fluoride (i.e., fluoride ions), toluene sulfonic acid hydrate (i.e., hydrogen ions), and zinc stearate (zinc ion). Moreover, the high recovery in percentage of the mercaptan group (ClPrSH) shows little further reaction with the cyclododecene occurred.

In a further study, it was determined what reagents would promote reaction of the mercaptan group to the olefin, i.e., cyclododecene. For this experiment, 1.5 mL of an approximately 0.009 M 3-chloro-1-propyl mercaptan/cyclododecene solution was reacted with various reagents, mostly compounding agents, to determine which would promote addition of the mercaptan to the cyclododecene. Again, a mole ratio of the reagent to sulfur compound was chosen such that equimolar levels of the reagent and mercaptan were used. Also, the reaction was conducted at 171° C. for 30 minutes and the results were obtained using GC/MS. The results of this study are shown in TABLE VI.

TABLE VI

Reaction of 1.5 mL of 0.009M 3-chloro-1-propyl
Mercaptan With Cyclododecene Promoted with Various Reagents

|  | Ratio Cpd/S | Weight Used (mg) | Recovered % ClPrSH |
|---|---|---|---|
| Sulfur | 1.07 | 0.51 | 135 |
| Heat only | — | — | 112 |
| No Heat | — | — | 100 |
| Benzoyl peroxide | 1.07 | 1.92 | 98 |
| Octadecyl amine | 0.98 | 3.91 | 55 |
| Santoflex 13 | 1.08 | 4.31 | 52 |
| PVI | 0.98 | 3.81 | 47 |
| DPG | 1.07 | 3.35 | 39 |
| ZnO | 0.99 | 1.19 | 11 |
| Dicyclohexyl amine | 1.13 | 3.05 | 3.1 |
| TMTD | 1.00 | 3.07 | 0.8 |
| CBS | 1.03 | 4.04 | 0.5 |
| CBS + ZnO | 0.90 + 0.98 | 3.64 + 1.18 | 0.2 |
| MBT | 0.98 | 2.44 | 0.1 |
| Zn stearate | 1.01 | 9.45 | 0 |

Based upon the results shown in TABLE VI, most of the compounding reagents did promote the reaction of the mercaptan group to the olefin. Notably, sulfur accelerators commonly used in sulfur curing such as TMTD (tetramethylthiuram disulfide), CBS (N-cyclohexyl-2-benzothiazole sulfenamide), MBT (mercaptobenzothiazole) and zinc compounds were the most active. Also notable, sulfur and benzoyl peroxide did not promote the reaction with cyclododecene (CDD). Thus, it should be evident from the foregoing that the use of 3-chloro-1-propyl mercaptan reagent to terminate the polymerization, and that the use of zinc stearate or other identified ions will deprotect the mercapto ends and further promote the reaction of the ends with the backbone of a polymer chain. Advantageously, this can be done during the vulcanization process for the rubber.

Various modifications and alterations that do not depart from the scope and spirit of this invention will become apparent to those skilled in the art. This invention is not to be duly limited to the illustrative embodiments set forth herein.

What is claimed is:

1. A vulcanized elastomeric composition of matter comprising:
    the reaction product of a sulfur-containing reagent with an anionic living polymer said reagent being selected from the group consisting of $R_3$—Si—S—R'—X, where R can all be the same or different and is selected from the group consisting of alkyls having from 1 to 8 carbon atoms, cycloalkyls having from 3 to 11 carbon atoms, or aryls having from 6 to 14 carbon atoms, and X is a halogen, to form a $R_3$—Si—S—R' ended polymer;
    a filler;
    processing oil; and
    a cure package containing a deprotecting agent and at least one sulfur cure accelerator.

2. The composition of claim 1, wherein said living anionic polymer is selected from the group consisting of homopolymers and copolymers of isoprene and butadiene, and, copolymers and terpolymers of styrene, butadiene and isoprene and combinations thereof.

3. The composition of claim 1, wherein $R_3$—Si—S—R'—X comprises tert-butyldimethylsilyl-3-chloro-1-propylsulfide.

4. The composition of claim 1, wherein said at least one sulfur cure accelerator comprises N-cyclohexyl-2-benzothiazole sulfenamide.

5. The composition of claim 1, wherein said at least one deprotecting agent includes zinc stearate.

6. A tire tread comprising the vulcanized elastomeric composition of claim 1.

7. A tire comprising the vulcanized elastomeric composition of claim 1.

8. A pneumatic tire comprising a vulcanized elastomeric composition of matter with reduced hysteresis properties, wherein said composition comprises a plurality of polymers functionalized with mercapto groups, said mercapto groups in a majority of said functionalized polymers being reacted with unsaturation sites in a polymer backbone, wherein said mercapto groups comprise tert-butyldimethylsilyl-3-chloro-1-propylsulfide.

9. A pneumatic tire, as set forth in claim 8, wherein said polymers are selected from the group consisting of homopolymers and copolymers of isoprene and butadiene, and, copolymers and terpolymers of styrene, butadiene and isoprene and combinations thereof.

10. A pneumatic tire, as set forth in claim 8, wherein said vulcanized elastomeric composition of matter further comprises
    a filler;
    processing oil; and
    a cure package containing a deprotecting agent and at least one sulfur cure accelerator.

11. A pneumatic tire, as set forth in claim 10, wherein said at least one sulfur cure accelerator comprises N-cyclohexyl-2-benzothiazole sulfenamide.

12. A pneumatic, as set forth in claim 10, wherein said deprotecting agent comprises zinc stearate.

13. A method for making a vulcanized elastomeric composition of matter comprising:
    terminating a living anionic polymer with a sulfur-containing reagent selected from the group consisting of $R_3$—Si—S—R'—X, where R can all be the same or different and is selected from the group consisting of alkyls having from 1 to 8 carbon atoms, cycloalkyls having from 3 to 11 carbon atoms, or aryls having from 6 to 14 carbon atoms, and X is a halogen, to form a $R_3$—Si—S—R' ended polymer;
    deprotecting the mercapto group prior to or during vulcanization by removing $R_3$—Si group; and
    attaching the mercapto group to a polymer backbone.

14. The method of claim 13, wherein said step of deprotecting the mercapto group occurs during sulfur vulcanization.

15. The method of claim 13, wherein said mercapto group is deprotected using an additive selected from the group consisting of additives containing $H^+$, additives containing $F^-$, and zinc compounds.

16. The method of claim 13, wherein said living anionic polymer is selected from the group consisting of homopolymers and copolymers of isoprene and butadiene, and, copolymers and terpolymers of styrene, butadiene and isoprene and combinations thereof.

17. A method for reducing hysteresis in an elastomeric composition of matter comprising:

deprotecting a $R_3$—Si—S—R' endcapped polymer, where R can all be the same or different and is selected from the group consisting of alkyls having from 1 to 8 carbon atoms, cycloalkyls having from 3 to 11 carbon atoms, or aryls having from 6 to 14 carbon atoms, to form a mercapto functional polymer having mercapto ends; and linking the functional polymer to an unsaturated polymer backbone during or subsequent to vulcanization, such that the resultant elastomeric composition formed includes a plurality of functional polymers having had mercapto ends wherein at least 20 percent of the mercapto ends of the functional polymers are reacted with an unsaturated polymer backbone of the same functional polymer or another of the functional polymers.

18. The method of claim 17, wherein said polymer is selected from a group consisting of homopolymers and copolymers of isoprene and butadiene, and, copolymers and terpolymers of styrene, butadiene and isoprene and combinations thereof.

19. The method of claim 17, wherein said $R_3$—Si—S—R' endcapped polymer is endcapped with tert-butyldimethylsilyl-1-propylsulfide.

* * * * *